(12) United States Patent
Boxer et al.

(10) Patent No.: US 10,305,594 B2
(45) Date of Patent: *May 28, 2019

(54) WIRELESS NETWORK CABLE ASSEMBLY

(71) Applicant: OFS Fitel, LLC, Norcross, GA (US)

(72) Inventors: Mark A Boxer, Pinetown, NC (US); John E George, Cumming, GA (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/872,156

(22) Filed: Jan. 16, 2018

(65) Prior Publication Data

US 2018/0198529 A1    Jul. 12, 2018

Related U.S. Application Data

(63) Continuation-in-part of application No. 15/082,178, filed on Mar. 28, 2016, now Pat. No. 9,893,812.

(60) Provisional application No. 62/250,134, filed on Nov. 3, 2015.

(51) Int. Cl.
*H04B 10/2575* (2013.01)
*H04J 14/02* (2006.01)
*G02B 6/44* (2006.01)

(52) U.S. Cl.
CPC . *H04B 10/25756* (2013.01); *H04B 10/25759* (2013.01); *G02B 6/4415* (2013.01); *G02B 6/4416* (2013.01); *G02B 6/4448* (2013.01); *H04J 14/028* (2013.01); *H04J 14/0282* (2013.01)

(58) Field of Classification Search
CPC ........................ H04B 10/25753; H04B 10/40; H04B 10/801; H04B 10/1143; H04W 88/085; G02B 6/4246; G02B 6/4292
See application file for complete search history.

(56) References Cited

U.S. PATENT DOCUMENTS

| | | |
|---|---|---|
| 5,550,476 A | 8/1996 | Lau |
| 9,030,370 B2 | 5/2015 | Petrovic |
| 9,196,956 B2 | 11/2015 | King et al. |

(Continued)

OTHER PUBLICATIONS

Penze, Rivael S., et al., "Fiber Powered Extender for XG-PON/G-PON Applications", Optical Society of America, J. Opt. Commun. Netw/vol. 6, No. 3/Mar. 2014, pp. 250-258.

*Primary Examiner* — Ted M Wang
(74) *Attorney, Agent, or Firm* — Wendy W. Koba, Esq.

(57) ABSTRACT

An optical fiber-based cable is formed to include pre-manufactured wireless access nodes included at spaced-apart locations along a length of the optical fiber cable. Each wireless access node is formed to include an antenna, a wireless radio transceiver, and an optical transceiver. The cable is formed to include an optical transmission fiber (or fibers) and an electrical power conductor. The optical fiber(s) couples to the optical transceiver within each wireless access node, and a power conductor from the cable terminates at the node and is used to energize both the wireless transceiver and the optical transceiver. The antenna is preferably formed as a sheathing member around at least a portion of components forming the node. Upon deployment, the wireless node portion of the cable is able to provide communication between the cable and wireless devices in its vicinity.

19 Claims, 13 Drawing Sheets

(56) References Cited

U.S. PATENT DOCUMENTS

| | | |
|---|---|---|
| 2006/0153565 A1* | 7/2006 | Park .................... H04J 14/0226 398/71 |
| 2007/0248358 A1 | 10/2007 | Sauer |
| 2013/0272696 A1 | 10/2013 | Palanisamy |
| 2014/0146906 A1 | 5/2014 | Zavadsky |
| 2014/0340279 A1 | 11/2014 | Bayram |

* cited by examiner

WIRELESS NETWORK CABLE ASSEMBLY

CROSS-REFERENCE TO RELATED APPLICATIONS

This application is a continuation-in-part of U.S. patent application Ser. No. 15/082,178, filed Mar. 28, 2016, which claims the benefit of U.S. Provisional Application Ser. No. 62/250,134, filed Nov. 3, 2015, with both applications herein incorporated by reference.

TECHNICAL FIELD

The present invention relates to a wireless network cable assembly and, more particularly, to an optical fiber-based network cable formed to include pre-manufactured wireless access nodes included at spaced-apart locations along a length of the optical fiber cable.

BACKGROUND

Within the domain of optical fiber-based communication networks, there is a constant discussion regarding various network architectures, often referred to as "FTTx", which stands for "fiber-to-the-x". The "x" may be "home" (FTTH), "curb" (FTTC), "node" (FTTN), etc. Recently, these competing architectures have been deployed to provide Gigabit per second connections to the ultimate end-user location (i.e., residence, office, mobile device or the like). Many providers are looking towards to the use of a FTTH configuration, installing optical fiber from a network "drop" all the way to each physical endpoint location. However, costs for installing the last few hundred feet of fiber to each physical location currently range from $300-$400 for the labor alone. It is also predicted that 5G networks will require the utilization of many small cell sites to supplement current macro-cell sites, in order to support the higher data rates to mobile users.

Thus, carriers would prefer a means for providing Gigabit connections to homes or businesses (in general, "end-user locations") without the need to install fiber to actual physical locations. Indeed, carriers are also interested in having a means to quickly and easily install small cells, providing such capacity quickly and with low cost, while not requiring specialized technicians to install the service. Future "5G" technologies may enable Gigabit wireless data rates within a range of about 100-500 meters, lending support to finding a way to use wireless connections for this last connection between end users and the network.

It is known that network RF wireless data rates drop in proportion to increased distance between the network-connected RF antenna and the end user wireless device. As mobile devices continue to proliferate and applications continue to require increasing data rates, service providers need to deploy sufficient wireless transceivers and antennae closer to the end user locations, so as to deliver acceptable data rates to the consumers. In most of today's configurations, wireless network components are deployed as stand-alone components, consisting of cables, wireless transceivers and antennas; these various components are then assembled in the field to meet the requirements of a particular installation. This process is time-consuming and requires multiple skills by field technicians to properly handle, install, and connect power conductors, optical fibers cables, wireless transceivers, and antenna components.

There are a variety of known arrangements describing the combination of optical fiber and power conductors in a single cable sheath. In these arrangements, the included power conductors may be used for monitoring applications, systems testing, and the like. However, these configurations are not used as also a source of wireless communication. To provide wireless network services to the same group of subscribers, the necessary wireless components are provided as separate piece parts (or sub-assemblies) and need to be field-assembled and field-connected into the desired network service area.

SUMMARY OF THE INVENTION

The needs remaining in the art are addressed by the present invention, which relates to a wireless network cable assembly and, more particularly, to an optical fiber-based cable formed to include pre-manufactured wireless access nodes included at spaced-apart locations along a length of the optical fiber cable.

In accordance with the present invention, a series of wireless access nodes are preferably incorporated into an optical fiber cable during assembly, with a determined span distance (or distances) created between wireless nodes in a given link. In particular, each wireless access node is formed to include at least one antenna, a wireless radio transceiver, and an optical transceiver. The cable is formed to include one or more optical fibers, as well as an electrical power conductor(s). The optical transceiver is coupled to an optical fiber(s) within the cable (either an individual fiber directly terminated at the transceiver, or a coupling device (tap, WDM, or the like) providing a connection between a transmission optical fiber and the optical transceiver). A power conductor from the cable terminates at the node to energize both the wireless transceiver and the optical transceiver. In some cases, a power transformer is included in the embedded wireless node and used to control the voltage applied as an input to these transceivers. Alternatively, optical fiber(s) may be used to provide power to transceivers in low power applications. At least one antenna is preferably formed as a sheathing member around at least a portion of the components forming the wireless access node. The node is enclosed within a housing that serves to integrate the node with the cable. Upon deployment of the cable, the included wireless node provides communication between the optical transmission fiber within the cable and wireless devices in the vicinity of the node.

In one embodiment, a single antenna is included within the node. Alternatively, multiple antennae (each having a different directionality or operating at a different frequency) may be included within the wireless node to form a multi-sector and/or a multiple-in, multiple-out (MIMO) configuration. In this case, the wireless radio transceiver is configured to send and receive messages at all of the various frequencies utilized by the antennae. In yet another embodiment a selected node may be further configured to include an external antenna element (perhaps installed in the field) for use in particular situations where additional RF coverage is desired.

One configuration of a wireless node-equipped optical fiber cable of the present invention may be used in a FTTN network, bringing wireless communications to individual end point locations downstream of an optical communication and power node. In another configuration, the inventive optical fiber cable may be deployed in an "indoor" installation, such as within an office building or residential location to provide wireless access to various locations within the structure.

A plurality of wireless node-embedded optical fiber cables may be concatenated in series to provide wireless communication service to a longer span of endpoints all service by the same optical communication and power node. Alternatively, one or a plurality of wireless node-embedded optical fiber cables formed in accordance with the present invention may be configured in a ring architecture, supported by a single optical communication and power node.

While a preferred embodiment of the present invention takes the form of a cable having factory-installed wireless nodes disposed at locations along the span of the cable, it is also possible to include one or more of these nodes within a cable subsequent to its manufacture.

One specific embodiment of the present invention takes the form of an optical fiber communication cable comprising a plurality of optical fibers disposed in an axial direction along a signal path, a plurality of electrical power conductors disposed in the axial direction along the signal path, and at least one embedded wireless access node disposed at a predetermined location along the signal path. The at least one embedded wireless access node functions as a termination for at least one optical fiber (from the plurality of optical fibers) and at least one power conductor (from the plurality of electrical power conductors). The embedded wireless node itself comprises at least one antenna, a wireless radio transceiver coupled to the at least one antenna and powered by the terminated at least one power conductor (the wireless radio transceiver providing bidirectional communication with wireless devices within range of the antenna and converting communications between radio signals and electrical signals), an optical transceiver coupled to the at least one optical fiber. The optical transceiver is powered by the terminated electrical power conductor and connected to the wireless radio transceiver for providing bidirectional communication with the wireless radio transceiver and converting communications between electrical signals and optical signals, with converted optical signals coupled onto the at least one optical fiber.

In an alternative embodiment of an embedded wireless node in accordance with the present invention, a single transmission optical fiber may be used to provide communication with a plurality of separate, spaced-apart embedded wireless nodes. The single transmission fiber may be configured with the nodes to create a "parallel" arrangement, with power splitter/combiners located at each node to receive a portion of the propagating optical signal. Alternatively, the cable and nodes may be configured to utilize separate wavelengths for each node, with wavelength division multiplexers (WDMs) disposed at each node to out-couple the proper wavelength. Variations of these configurations are contemplated as well, particularly utilizing passive optical networking (PON) protocols.

Other and further embodiments and advantages of the present invention will become apparent during the course of the following discussion and by reference to the accompanying claims.

BRIEF DESCRIPTION OF THE DRAWINGS

Referring now to the drawings, where like numerals represent like parts in several views.

DETAILED DESCRIPTION

Figure 1:
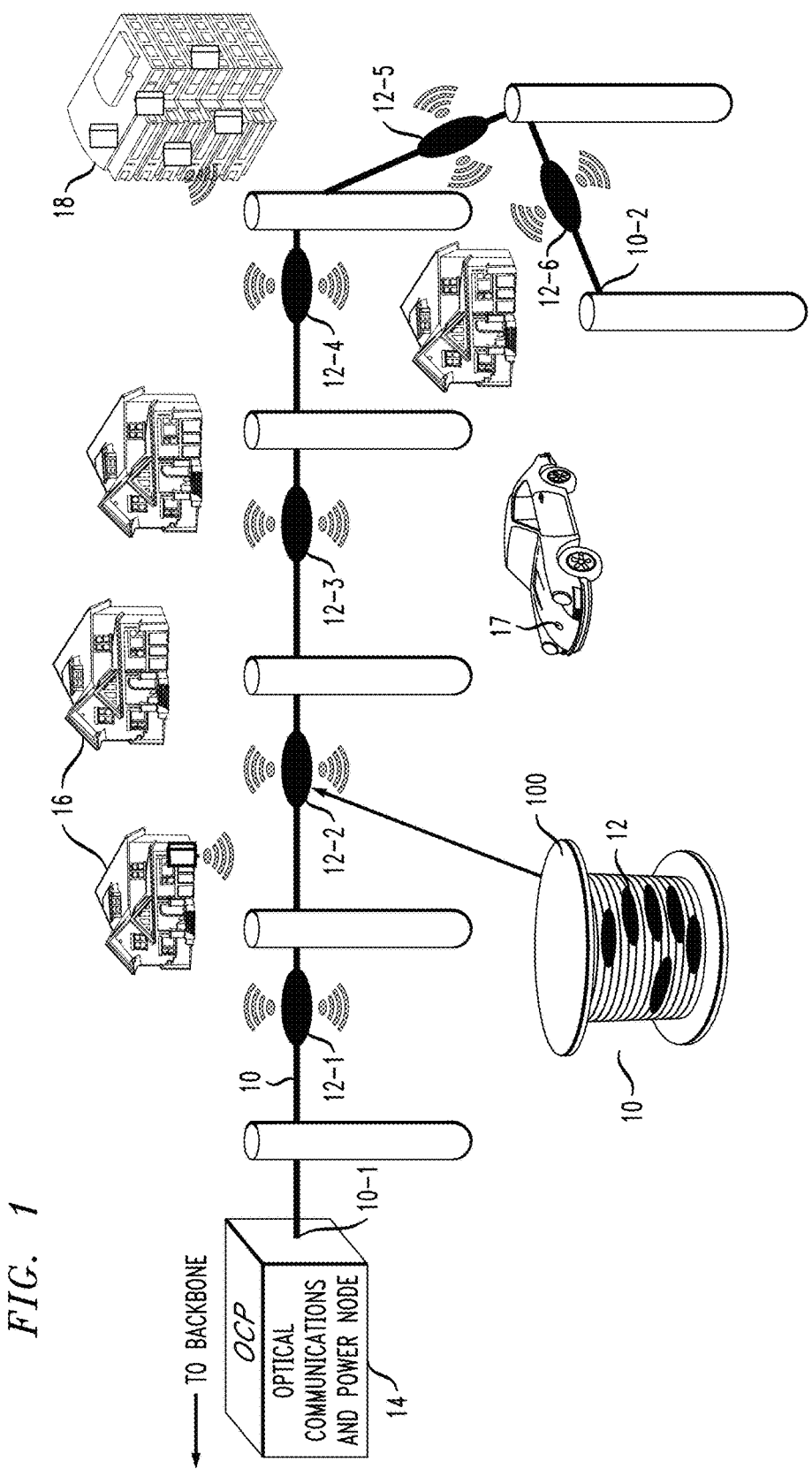
FIG. 1 illustrates an exemplary installation of an optical fiber cable including embedded wireless nodes in accordance with the present invention.

FIG. 1 illustrates an exemplary "fiber-to-the-wireless node" (FTT-WN) architecture that may utilize a wireless node-embedded optical cable 10 formed in accordance with the present invention to provide the "last mile" communication link between an optical communication network and a local group of separate end users (and also various mobile wireless devices within range of one of the embedded nodes). In this simplified diagram, optical cable 10 is shown as a type of "distribution" cable from an optical communications and power (OCP) node 14, where OCP node 14 may be located at the entrance to a neighborhood, along a city street, in a building, or the like. Although not shown, it is understood that OCP node 14 is connected to the backbone communications network and provides bi-directional communication with this backbone network. In this particular example, optical cable 10 is manufactured to include a set of six separate embedded wireless nodes 12, disposed in a spaced-apart configuration along optical cable 10 from a first termination 10-1 at OCP node 14 to a second termination 10-2 at a utility pole (this termination may also be between utility poles). Wireless nodes 12 may be disposed at regular intervals along cable 10, or with any other required spacing being adjacent nodes, as dictated by a specific configuration where the cable is to be installed.

Although the example shown is an "aerial" deployment, an embodiment of the present invention may also be included within an underground cable, with wireless nodes perhaps installed to loop above ground to facilitate wireless communication. Also, as will be described below, an indoor deployment of the inventive cable (such as within a multi-tenant office building or the like) is considered to be a viable embodiment. A reel 100 of this inventive wireless node-embedded optical fiber cable 10 is also shown in FIG. 1. Indeed, one advantage of the utilization of embedded wireless nodes formed in accordance with the present invention is that they may be disposed coaxially along the direction of the cable, allowing for the structure to be wound on a reel for shipment and storage purposes, and subsequently placed in the field using only conventional cable installation methods (a significant cost savings versus the need to train technicians on wireless node installations).

As will be discussed in detail below, each embedded wireless access node is formed to include one or more wireless antennae, a wireless radio transceiver, and an optical transceiver. An electric power conductor running through optical cable 10 is used to energize the components of each wireless embedded node 12. A separate optical fiber (or pair of fibers) is terminated at each embedded node, providing bidirectional optical communication between each embedded wireless node 12 and OCP node 14.

Operating as a conventional wireless access point, an exemplary antenna within node 12 broadcasts and receives its operating frequency (or frequencies) within a geographic area that is accessible by the various end users, including residences 16, mobile devices 17 and office buildings 18 in the vicinity of that particular node 12. Thus, each end-user location (fixed or mobile) is able to communicate via a wireless connection with the FTT-WN network, with the components in node 12 converting the received electrical communication signal into an optical signal for transmission upstream along the associated optical fiber (and, conversely, converting incoming optical signals into wireless radio signals to be transmitted to the wireless end-users).

Rather than relying on the need to install optical fiber to each fixed-location residence 16 and building 18, the architecture of the present invention utilizes a plurality of embedded wireless access nodes 12 that are included at various locations along optical cable 10. These wireless access nodes 12 may be embedded within optical cable 10 during its manufacture, allowing for the deployment of a single FTT-WN cable 10 to communicate with all wireless devices in a geographic area (either fixed or mobile) without the need to include any cabling to the endpoints, or the need to install equipment at the fixed-location residences or businesses.

Figure 2:
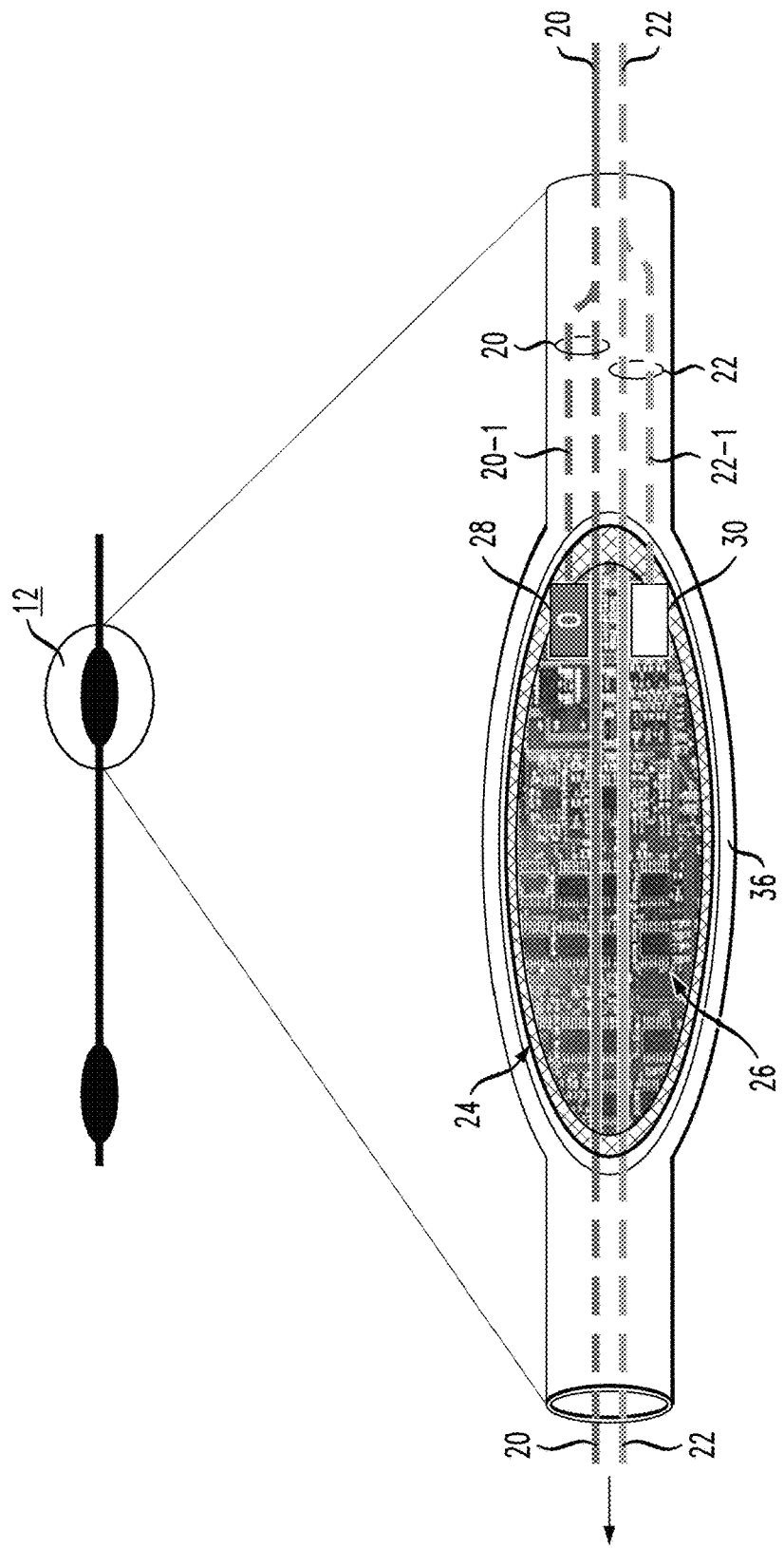
FIG. 2 is a cut-away side view of an exemplary wireless node formed in accordance with the present invention.

FIG. 2 is a cut-away side view of an exemplary embedded wireless node 12 as constructed within optical fiber cable 10. In accordance with one or more embodiments of the present invention, this exemplary wireless node 12 is formed to include a wireless antenna 24 that is used to broadcast RF signals in the local proximity of node 12, as well as receive RF signals from wireless devices in use within the range of node 12. Wireless antenna 24 is coupled to a wireless radio transceiver 26 included within node 12, where wireless radio transceiver 26 is in turn connected to an optical transceiver 28 disposed in node 12. In this particular embodiment, an electrical power transformer 30 is included and used to supply electrical power to both wireless radio transceiver 26 and optical transceiver 28.

As mentioned above (and discussed in detail below in association with FIGS. 5-7), optical fiber cable 10 includes an electrical conductor that energizes the components within each embedded wireless node 12 (and may also serve other purposes of bringing electrical control and/or signaling within optical cable 10 as well-known in the art). One or more optical fibers are included within cable 10 and used to create a bi-directional optical communication links with each embedded wireless node (as well as provide communication with OCP 14). As mentioned above, the included optical fiber(s) could potentially be used for power transmission in a low-power configuration.

In the particular embodiment as shown in FIG. 2, a plurality of optical fibers 20 is shown as passing through this particular node 12, where a first optical fiber 20-1 from this plurality is shown as separated out and coupled to optical transceiver 28. The remaining fibers within the plurality of optical fibers 20 bypass this particular node and continue along cable 10 to connect to the remaining downstream embedded wireless nodes (also shown in FIG. 5). Similarly, there are several electrical power conductors 22 that pass along through cable 10 in this particular embodiment, where a first cable 22-1 is shown as connected to electrical power transformer (or termination) 30. The remaining conductors 22 continue on along cable 10 to be terminated within one of the remaining wireless nodes along the span.

In operation, electrical power transformer 30 energizes wireless radio transceiver 26 to initiate the broadcast of an RF signal via antenna 24. Wireless communication devices in the vicinity of node 12 can respond to the RF signal and begin to communicate with the backbone network (not shown) via embedded wireless node 12. In particular, signals from the wireless devices are captured by antenna 24 and coupled into wireless radio transceiver 26. The radio signals are converted into an electrical signal format within transceiver 26 (in a conventional manner), which then forwards the electrical signals as an input to optical transceiver 28. Optical transceiver 28, in turn, converts the electrical signal into optical form and couples the optical signal into optical fiber 20-1 for upstream transmission back to OCP node 14. It is to be understood that various specific configurations may be used in the implementation of both wireless radio transceiver 26 and optical transceiver 28, where these configurations are well-known to those skilled in the art and need not be discussed in detail in order to understand the subject matter of the present invention.

Figure 3:
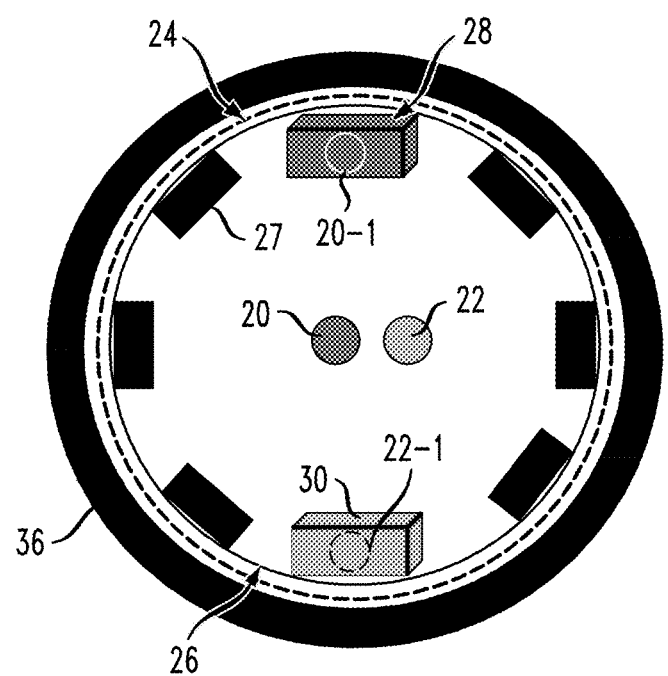
FIG. 3 is a cut-away end view of the node of FIG. 2, particularly illustrating the location of the "pass-through" optical fibers and electrical power conductors with respect to the wireless access node components.

FIG. 3 is a cut-away end view of an exemplary embedded wireless node 12, which in this case illustrates the use of a flexible integrated circuit board as a substrate for wireless radio transceiver 26. The ability to bend wireless radio transceiver 26 so as to encircle a portion of node 12 facilitates the ability to form embedded wireless node 12 as a relatively small component (although it is to be understood that a bendable transceiver is not specifically required). Also evident in this view is that RF antenna 24 is formed to encircle the remaining components (this specific configuration of an RF antenna is exemplary only; various other arrangements for co-located RF antennas may be used). For this particular configuration, optical fibers 20 (except for fiber 12-1 that terminates at this node) and power conductors 22 (except for conductor 22-1) are shown as being disposed in a central region of node 12, removed from the interconnected components forming embedded wireless access node 12.

Figure 4:
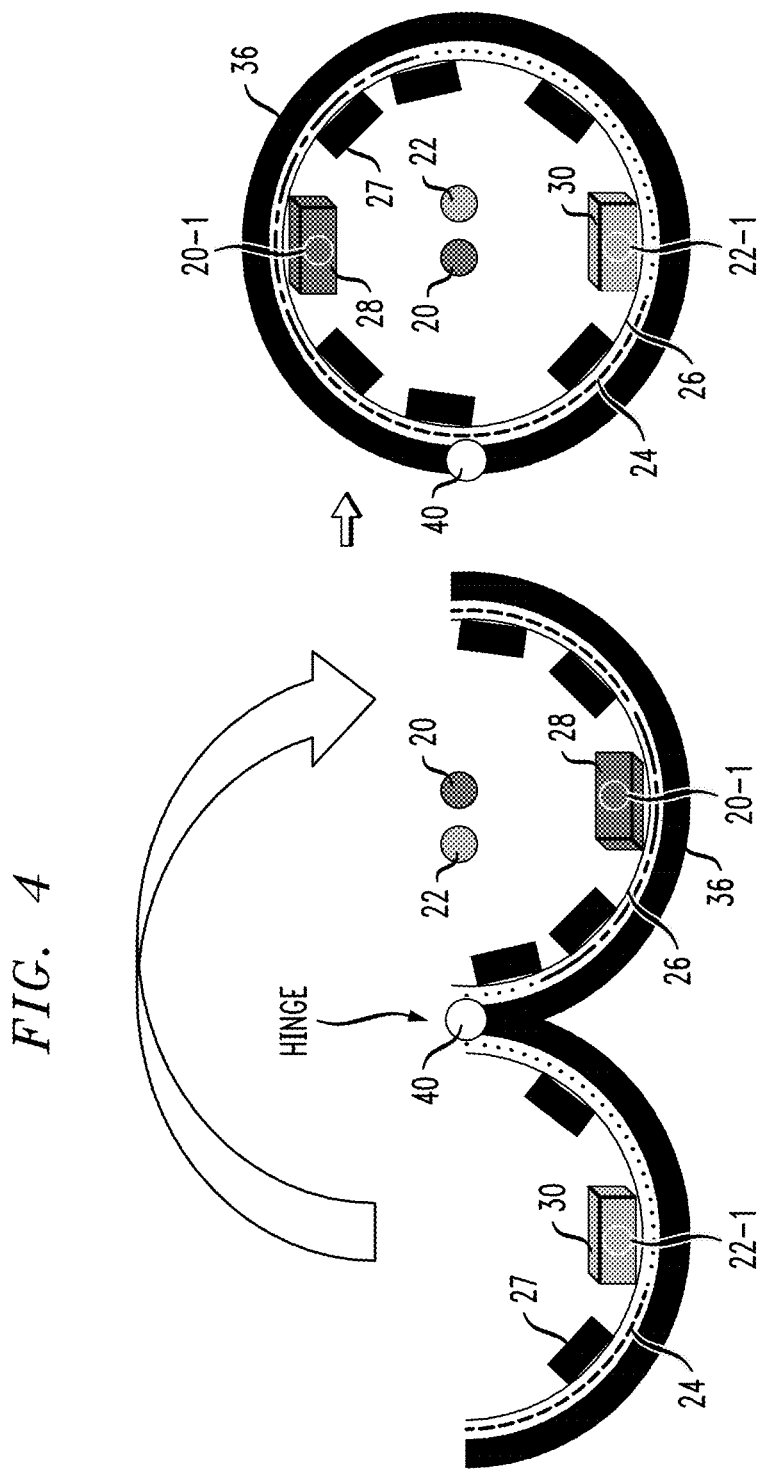
FIG. 4 illustrates one exemplary type of enclosure useful for installing a wireless access node along an optical fiber cable.

As mentioned above, one advantage to the utilization of embedded wireless nodes within an optical cable assembly is the ability to pre-manufacture a standard or engineered FTT-WN cable to include these nodes. FIG. 4 shows one exemplary construction arrangement where a clam-shell type of enclosure 36 is used to encase embedded wireless node 12. A hinge 40 is used to allow for ingress to node 12, opening along one side to expose the interior of node 12. The various components of the wireless access node are then installed within the opened enclosure, and the connections are made to optical fiber 20-1 and power conductor 22-1. Indeed, an additional feature of incorporating the wireless nodes is the ability to store spare cable (necessary at times for maintenance operations in the field) within enclosure 36. Again, it is to be noted that the type of enclosure for the node is not limited to this clam-shell type of configuration. As long as the enclosure includes space to make both fiber and power splices (or support connector ports for these connections and possibly, as mentioned above, include a provision for spare cable), any suitable type of housing may be employed. Indeed, the connector ports for both the optical and electrical connections may be included either inside or outside of the enclosure. Once the assembly is complete, enclosure 36 is closed (via hinge 40) and may be sealed to prevent moisture, debris, etc. from entering node 12.

Figure 5:
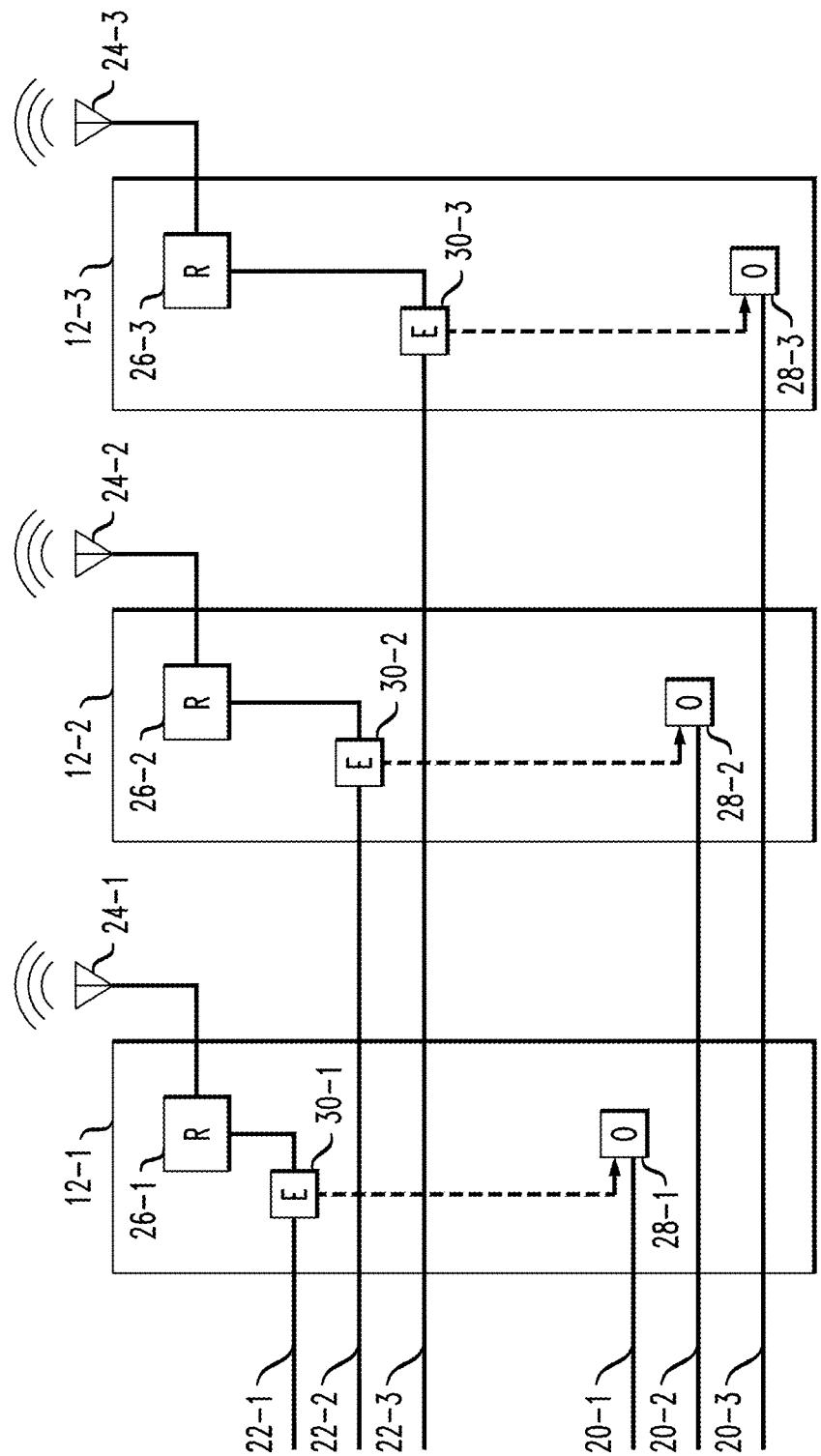
FIG. 5 is a simplified diagram of a set of three embedded wireless nodes, showing the terminations of various optical fibers and power conductors within each node.

FIG. 5 is a simplified block diagram depicting the deployment of a set of three such embedded wireless nodes 12-1, 12-2, and 12-3 along optical fiber cable 10. FIG. 5 illustrates the particular connections of the various optical fibers and power conductors for an exemplary "parallel" connection of nodes 12, using a plurality of separate optical fibers (or fiber pairs), with a selected fiber (or pair) coupled to each node in a one-to-one relationship. That is, each wireless node 12-1, 12-2, and 12-3 is shown as having a separate power conductor, shown as conductors 22-1, 22-2 and 22-3 in FIG. 5. A separate optical fiber contained within cable 10 is used as a bi-directional optical communication link to each optical transceiver, where these fibers are shown as 20-1, 20-1, and 20-3 in FIG. 5 (the power circuit shown within the node is exemplary only, various other circuits may be used).

Figure 6:
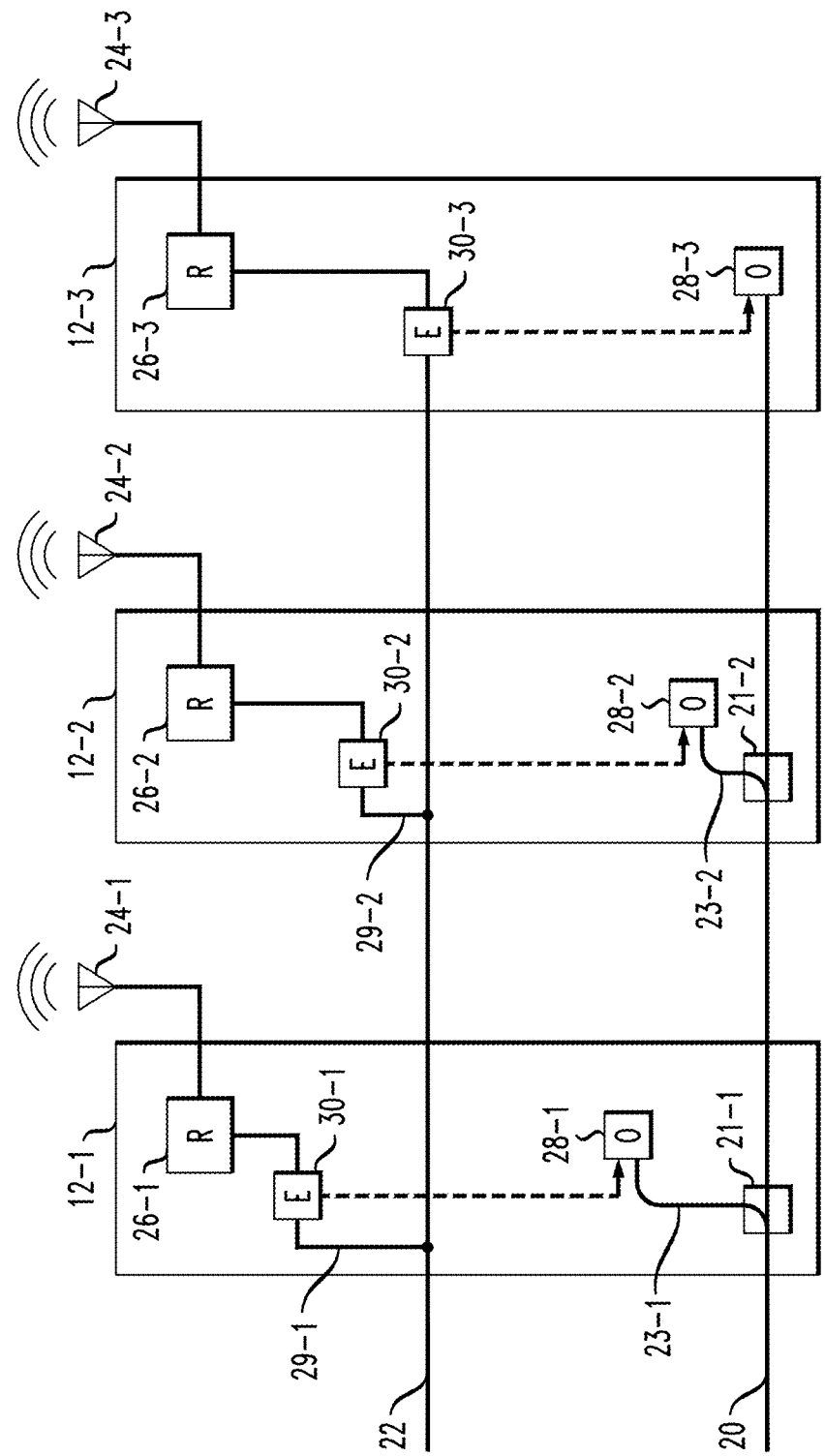
FIG. 6 is a simplified diagram of an alternative configuration for a set of three embedded wireless nodes, in this case using a single optical fiber to support transmission to multiple nodes, with a splitter/coupler provided at each node.

Alternatively, embedded wireless nodes 12 may be configured in a "series" connection with optical cable 10. FIG. 6 is a simplified diagram of nodes 12-1, 12-2, and 12-3 arranged in one such series connection. Here, a single optical transmission fiber 20 passes along cable 10 (or perhaps a single "pair"). Nodes 12-1 and 12-2 in this particular embodiment are shown as including an optical splitter/combiner 21 (designed as elements 21-1 for node 12-1 and 21-2 for node 12-2). Splitter/combiner 21 is well-known in the art as a power divider/combiner for out-coupling a portion of a propagating optical signal from optical fiber 20. Here, the out-coupled optical signal propagates along a tap fiber 23 that terminates at the associated optical transceiver 28. The configuration is reciprocal in operation and is thus also able to introduce optical signals via splitter/combiner 21 into optical fiber 20 for propagation toward OCP 14 (not shown). The configuration of FIG. 6 also shows the use of a single electrical conductor 22, with separate connectors 29 used to supply electrical energy to each separate wireless transceiver 30.

Figure 7:
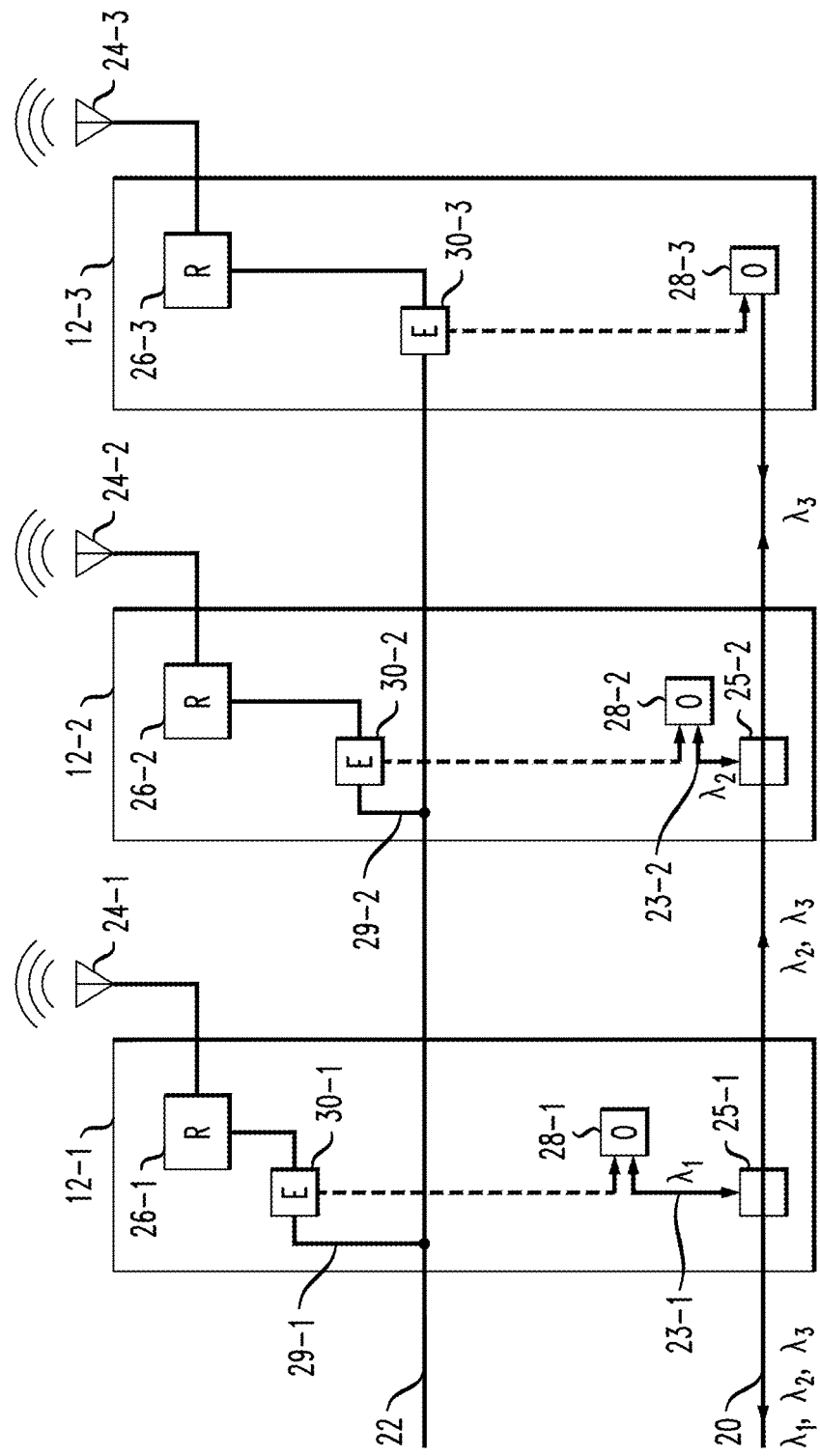
FIG. 7 is a simplified diagram of another alternative configuration for a set of three embedded wireless nodes, in this case using a single optical fiber to support transmission to multiple nodes, with a different wavelength utilized by each node and a WDM disposed at each node to receive/transmit on its associated wavelength.

FIG. 7 illustrates an alternative configuration for providing optical communication with a plurality of embedded wireless nodes 12 disposed along inventive cable 10. Similar to the configuration shown in FIG. 6, a single optical fiber 20 (or fiber pair) is utilized to provide optical signal transmission in both directions along cable 10. In this case, optical fiber 20 is able to support multiple signals operating at different wavelengths, with each node 12 configured to transmit/receive optical signals on a unique wavelength. Referring to FIG. 7, it is presumed for this example that three different signals, operating at wavelengths $\lambda_1$, $\lambda_2$, and $\lambda_3$, are associated with nodes 12-1, 12-2, and 12-3. A first WDM 25-1 is shown as included with node 12-1 and functions to direct the specific signal operating at $\lambda_1$ into optical transceiver 28-1. A second WDM 25-2 is shown as included with node 12-2 and functions to direct the specific signal operating at $\lambda_2$ into optical transceiver 28-2. The remaining signal operating at $\lambda_3$ will remain propagating along optical fiber 20 and be coupled to transceiver 28-3 at node 12-3 (it is to be understood that an arrangement of three nodes and three wavelengths is exemplary only, various other numbers of nodes and wavelengths are possible and contemplated for use in a system formed in accordance with the present invention).

Figure 8:
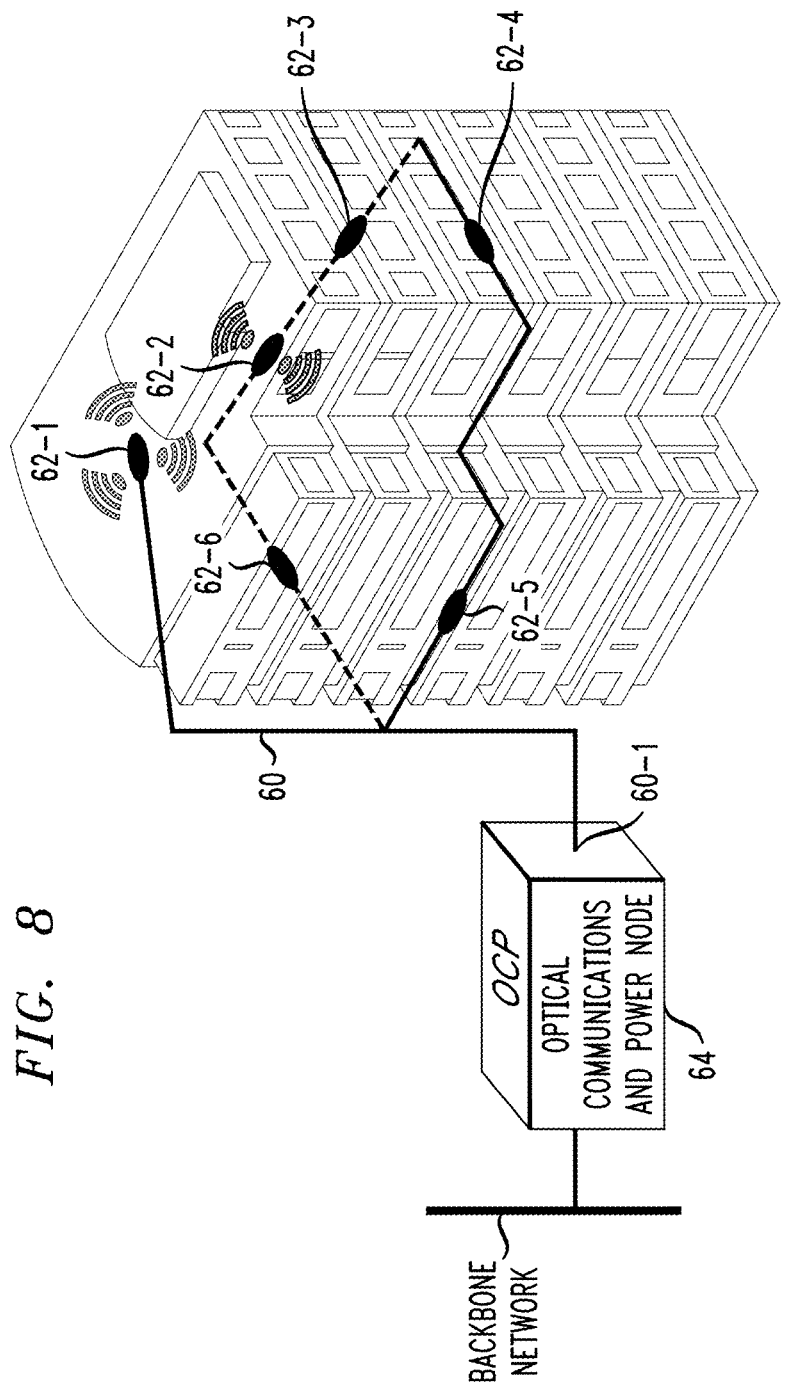
FIG. 8 illustrates an alternative type of installation for a wireless node-embedded optical fiber cable formed in accordance with the present invention, particularly showing an in-building or build-wrap deployment configuration.

Regardless of the specific parallel or series connections as shown in FIGS. 5-7 (for example), each wireless node is properly disposed along a section of optical cable 10 (for example, as shown in FIG. 1) so that wireless devices within the range of its RF signal can communicate with that node. One exemplary embodiment as shown in FIG. 8 illustrates a use of the inventive optical cable within (or around the exterior as a type of "wrapping") a building structure. Here, an optical cable 60, including a plurality of spaced-apart embedded wireless access nodes 62 is disposed so as to distribute the embedded wireless access nodes at various locations within (or "on") a building. As before, a first end termination 60-1 of cable 60 is coupled to an OCP node 64 (part of a larger FTTx network).

Figure 9:
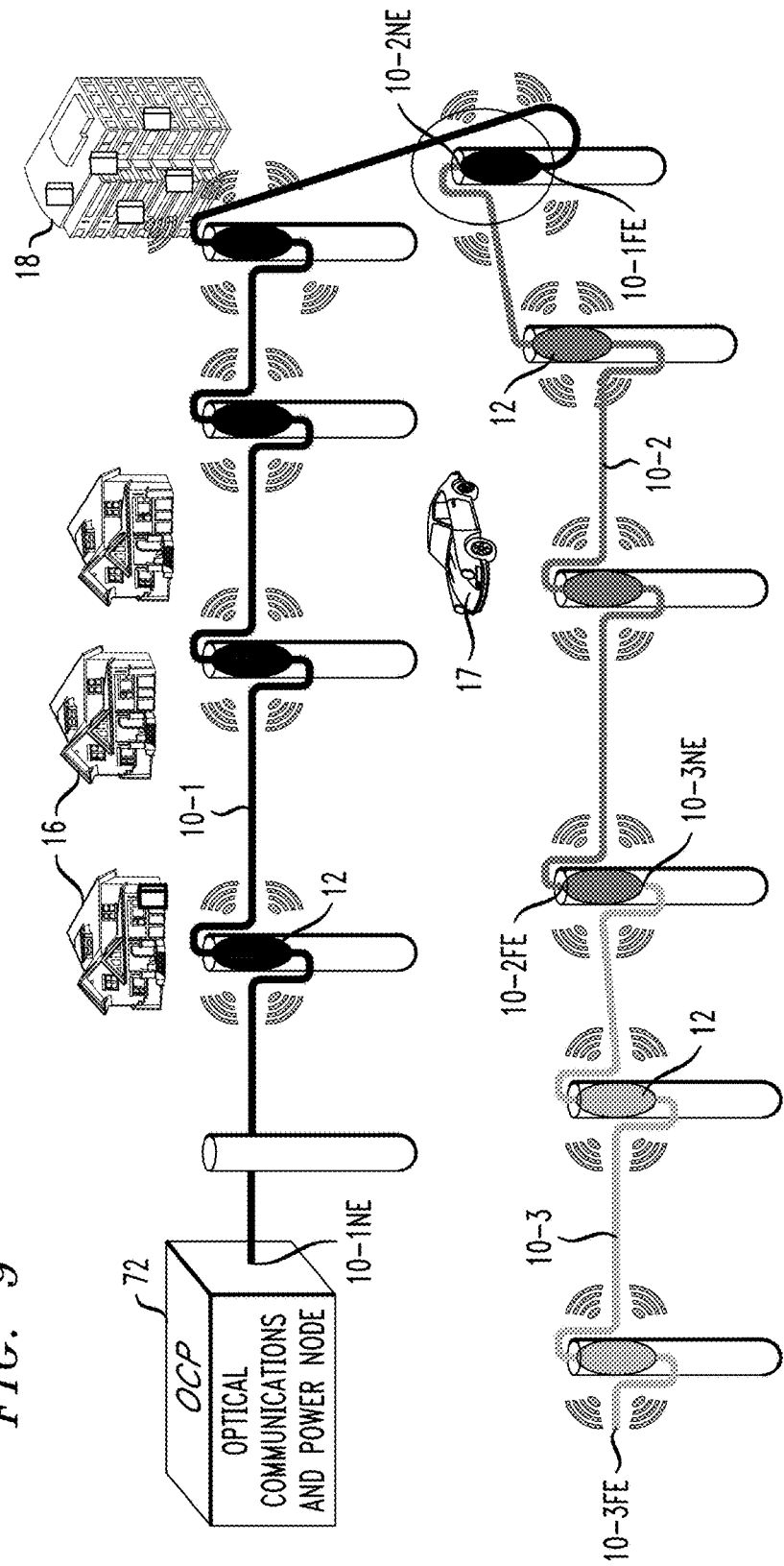
FIG. 9 is a diagram illustrating the formation of an optical communication network utilizing a concatenated set of optical fiber cables, each including one or more embedded wireless access nodes formed in accordance with the present invention.

It is possible to connect a set of these inventive cables together to extend the length of a span connected to a single OCP node. FIG. 9 illustrates an exemplary embodiment where a set of three separate cables 10-1, 10-2, and 10-3 are connected together in series to provide this architecture. In this configuration, the set of optical fibers are spliced (or otherwise mated) together in series, with a connection also made between a power conductor in one span with a power conductor in a subsequent span. A near-end termination 10-1NE of first optical fiber cable 10-1 is shown as coupled to a local OCP node 72. The opposing far-end termination 10-1FE of cable 10-1 is coupled to a near-end termination (denoted 10-2NE) of second optical fiber 10-2. Similar connections are made between optical fiber cables 10-2 and 10-3. In this exemplary aerial configuration, the various embedded wireless nodes 12 are shown as disposed in an orthogonal orientation with respect to the axial direction of cable 10.

Figure 10:
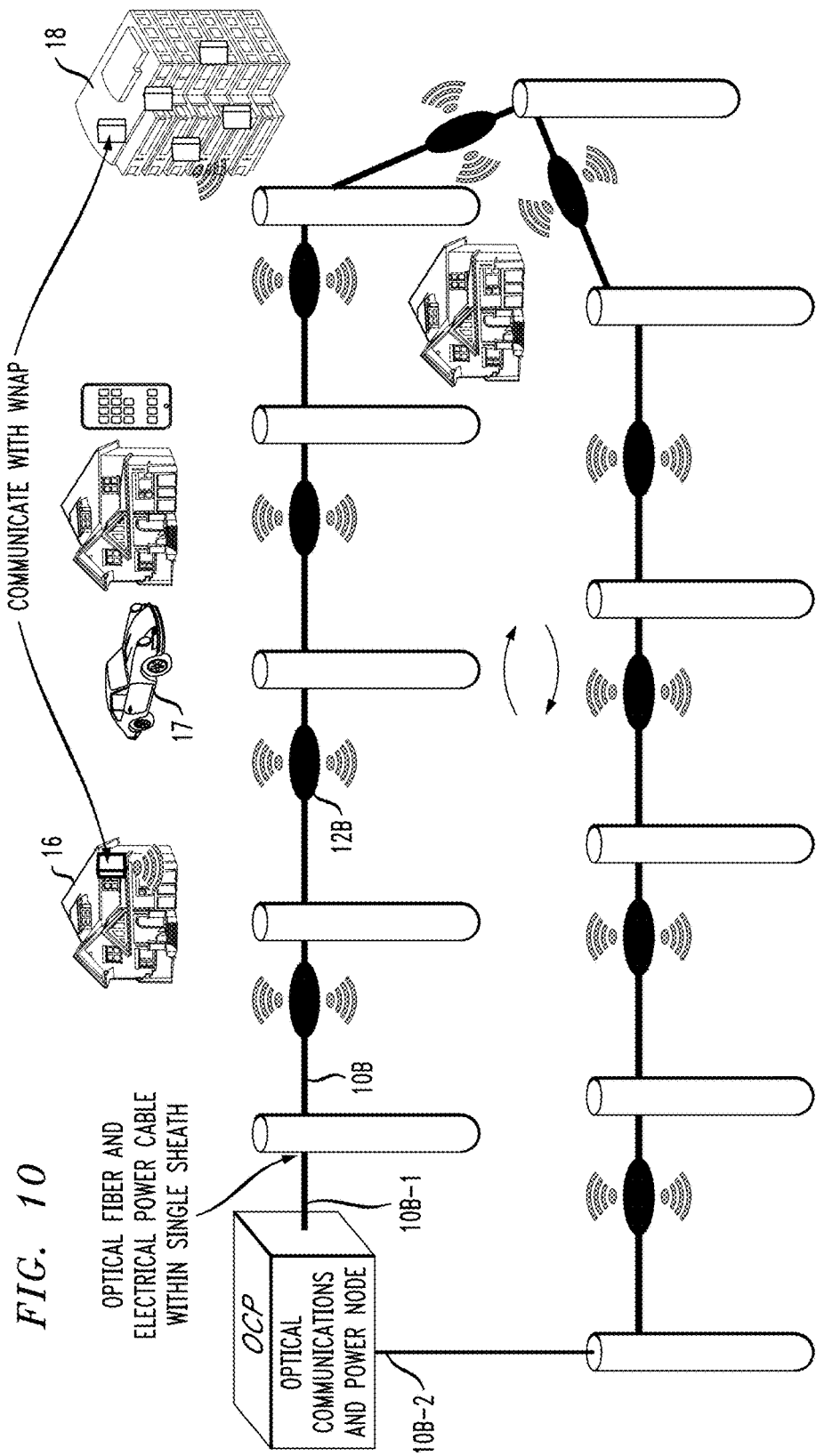
FIG. 10 illustrates an alternative network topology utilizing an optical fiber cable of the present invention, in this case comprising a ring architecture with a plurality of embedded wireless access nodes configured for bi-directional communication.
Figure 11:
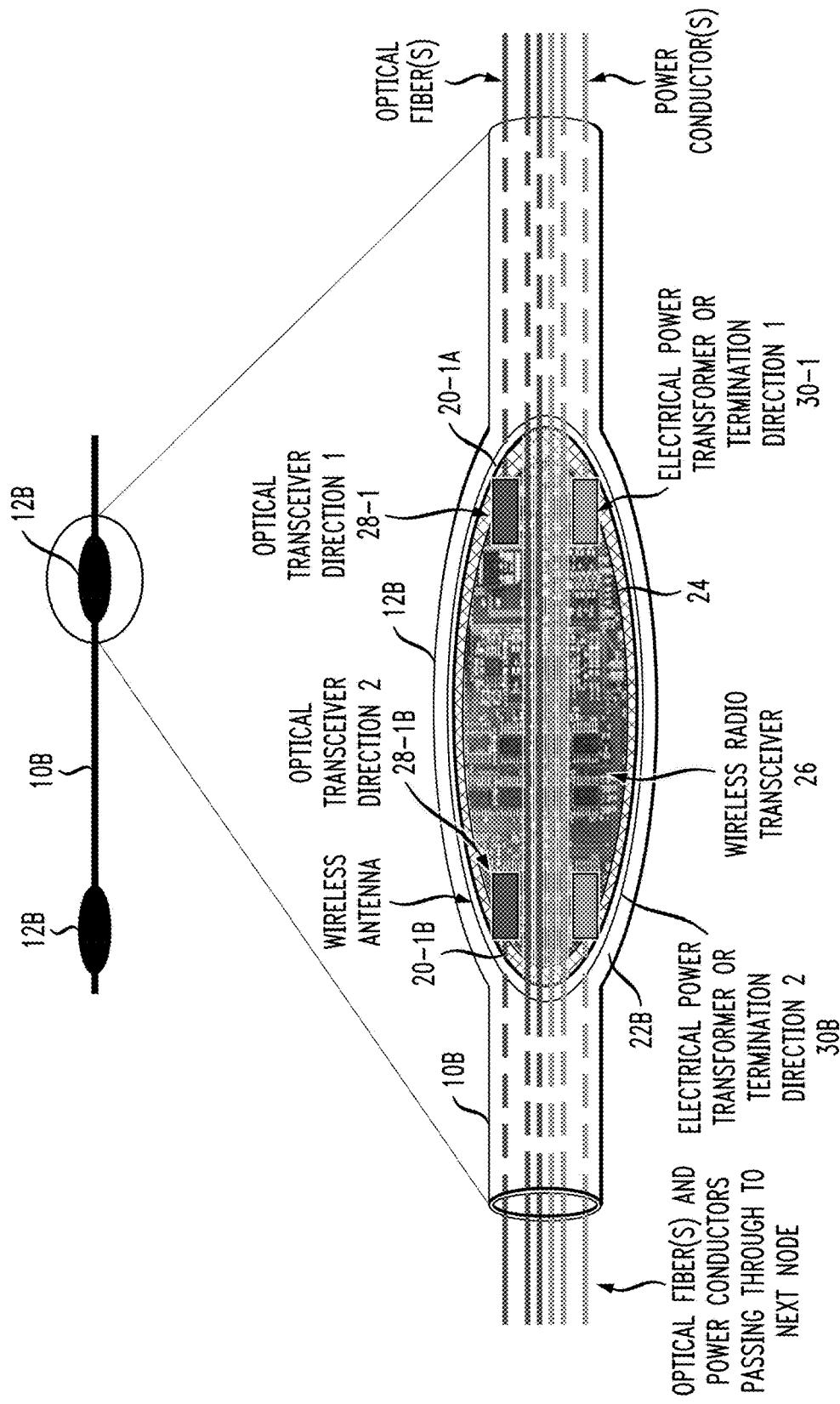
FIG. 11 is a cut-away view of an exemplary bi-directional embedded wireless access node as used in the ring network of FIG. 10.

As mentioned above, it is also possible to configure the inventive cable including embedded wireless access nodes in a ring architecture. FIG. 10 illustrates an exemplary ring architecture embodiment, where each embedded node (designated 12B in this embodiment) is capable of supporting bi-directional communication. FIG. 11, described below, illustrates an exemplary bi-direction wireless access node formed in accordance with the present invention. Continuing with the description of FIG. 10, an exemplary bidirectional cable 10B formed in accordance with the present invention is shown as coupled at a first end termination 10B-1 to OCP 82, and thereafter disposed along a predetermined "ring" path, with various nodes 12B positioned at locations requiring wireless communication capability. In accordance with this ring architecture embodiment, the opposing, second end termination 10B-2 of cable 10B also terminates at OCP 82. In this configuration, therefore, it is possible to support communication in either direction around the ring.

FIG. 11 is a cut-away view of an exemplary bi-directional embedded wireless access node 12B formed in accordance with the present invention. In order to support bidirectional communication around the ring, node 12B is shown as including an additional optical transceiver 28-1B, coupled to an additional optical fiber 20-1B. An additional electrical conductor 22B is included in bidirectional node 12B to provide power to the additional signal path. Bidirectional node 12B includes a similar antenna configuration (such as antenna 24, as shown in FIG. 11), as well as a similar wireless transceiver 26 (which is able to communicate with both optical transceivers 28-1 and 28-1B). If desired, an additional transformer 30B may be included in the event that transformer 30-1 fails or is severed from the connection.

Figure 12:
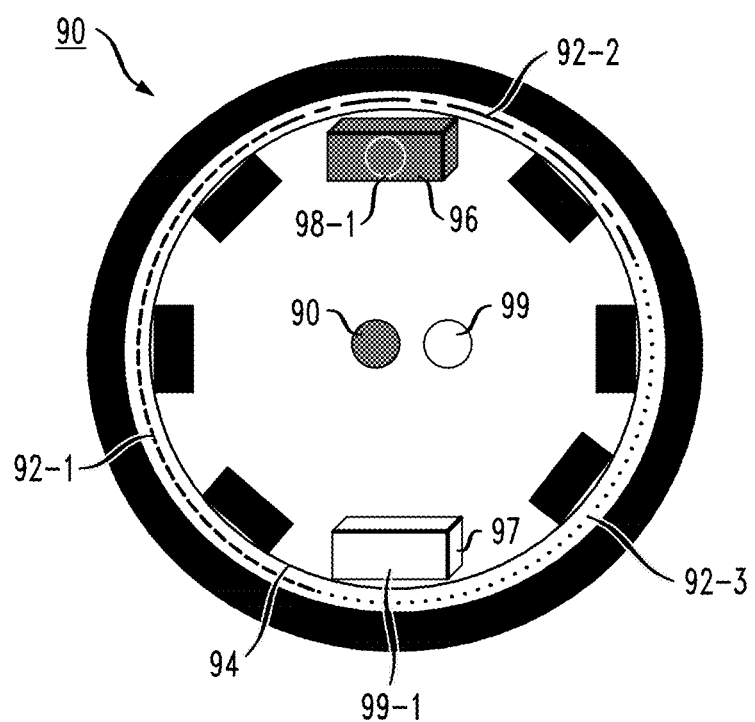
FIG. 12 is a cut-away end view of an alternative embodiment of the present invention, in this case including a set of three antennas (operating at different frequencies, or at the same frequency and oriented to cover different geographical areas) within the inventive wireless access node.

As mentioned above, it is possible to configure a wireless node in accordance with the present invention that utilizes multiple frequencies and/or multiple beams (oriented in different directions) to support communication with wireless devices. FIG. 12 is a cut-away end view of an exemplary embedded wireless node 90 that is configured to include a set of three wireless sectors. In particular, node 90 includes a set of three RF antennae 92-1, 92-2 and 92-3, disposed to encircle node 90 in the manner shown. A first RF antenna 92-1 is indicated by the dashed line in FIG. 12, a second RF antenna 92-2 is indicated by the dash-dot line in FIG. 12, and a third RF antenna 92-3 is indicated by the dotted line in FIG. 12. A wireless radio transceiver 94 is properly configured to provide bidirectional communication for all three frequencies (or beams), and is coupled to an optical transceiver 96 which is used in the same manner as described above to pass the communications along an included optical fiber 98-1. An electrical power transformer 97 (or termination, as the case may be) is also shown within wireless access node 90. As with the above-described embodiment, by-pass optical fibers 98 and by-pass power conductors 99 are disposed in a central region of node 90.

Figure 13:
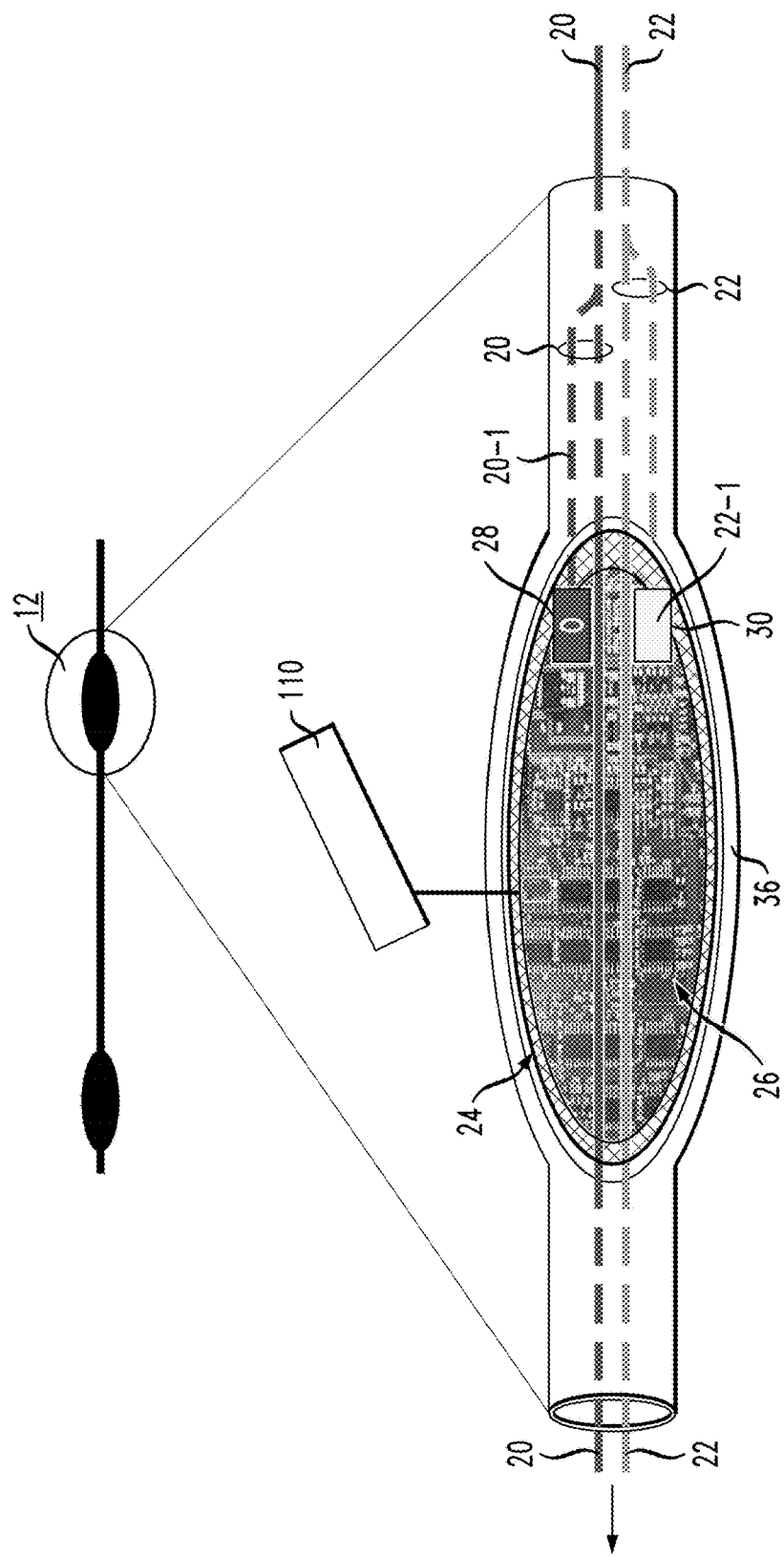
FIG. 13 illustrates yet another embodiment of the present invention, where a selected embedded wireless access node is further configured to include an external antenna component.

While it is contemplated that in most cases the embedded wireless access nodes of the present invention will be initially configured and constructed to include all necessary antennae, the need may arise for one or more additional antennae to be installed in the field. Indeed, in accordance with another embodiment of the present invention, is it possible to incorporate an external antenna element with a given embedded access node. FIG. 13 illustrates this example, where an additional RF antenna 110 (of any known type) is disposed on the outer covering 36 of node 12, with connections made through outer covering 36 to wireless radio antenna 26. Additionally, it is to be understood that a wireless node itself may be replaced in the field upon a recognized failure of the node. That is, a "replacement node" may comprise an embodiment of the present invention, where field personnel are able to remove a non working node and easily insert a replacement node by splicing the fully-formed node in place along the cable. Indeed, this type of field installation may be used to insert additional wireless nodes along a given span of cable as the need for additional wireless access points increases.

Advantageously, the wireless node-embedded optical cable of the present invention can be used independently of any wireless network protocol or frequency, and can be applied to cellular, macro, micro, or small cell networks, wifi networks, distributed antenna systems, or other network architectures based upon wireless communications. The optical fibers can be single mode or multimode standard telecommunications grade optical fibers, for example including but not limited to those compliant with ITU-T recommendation G.652 or G.657, or IEC-60793-2, including but not limited to silica optical fibers with a nominal cladding diameter of 125 microns and polymer-coated nominal diameter of 200-250 microns. The optical fibers may be packaged inside buffer tubes (which may be gel-filled), or tight buffered, or disposed in flat or rollable ribbons. Optical splitters or WDM filters may be included in the cable or node to facilitate communications using appropriate telecommunications protocols.

The power conductors may be comprised of copper, aluminum, or any other suitable electrically-conductive material, for example but not limited to, copper conductors of 4 to 24 gauge, so as to meet powering requirements for multiple nodes, with each node including the electrically-powered wireless radio transceiver and the electrically-powered optical transceivers as described above, with the wireless nodes placed along the cable at various pre-determined distances from a an optical communications and power (OCP) node. The power conductors may be composed of either stranded or solid conductors.

Depending on the power and communications requirements, the optical fiber and power conducting strands may be connected either in series or in parallel with the nodes, and may be connected either to individual conductors per node, or tapped/branched from one or more master conductors. Separate strands with the purpose of serving as antennae, may be deployed either stranded in a helical or "S-Z" manner around the core of the cable, or longitudinally along the axial length of the cable, or within the node, either inside or embedded in the outer sheath. The outer sheath may be made of common jacketing materials such in indoor, indoor/outdoor, or outdoor environments, such as polyethylene or PVC.

The cable itself may include strength members to limit the elongation of the metallic components and fibers to industry-appropriate strain levels to meet commonly-accepted reliability requirements. The cable also includes well-known components required to enable installation and long-term reliable operation to occur including, but not limited to, components to handle "crush", tension, self-support, impact and long-term environmental exposure.

The wireless transceiver may be an existing or new design operating in any available licensed or unlicensed frequency band, supporting but not limited to 802.11 Wifi, 802.16 WiMax, or any release of LTE or "5G" or further technology, and may employ multiple-in-multiple-out (MIMO) and/or orthogonal frequency division multiplexing (OFDM) technology. The wireless transceiver may be mounted on a flexible circuit board that may be bent to a radius of about 3" or less to enable the circuit board to fit in and be factory assembled inside the node package.

The optical transceiver may be, but is not limited to, a 1000BASE-BX small form pluggable transceiver that supports bi-directional 1 Gbit per second transmission and reception on a single optical fiber between the node and the hub, a 1000BASE-SX small form pluggable transceiver that supports duplex 1 Gbit per second transmission and reception on a pair of OM4, OM3, OM2, or OM1 multimode transmission fibers between the node and the hub, or a 10GBASE-BXU small form pluggable transceiver which supports bi-direction 10 Gbit per second transmission and reception on a single optical fiber between the node and the hub, a 10GBASE-LR transceiver supporting bi-directional transmission using a pair of optical fibers, a 25GBASE-LR transceiver supporting bi-directional transmission on a pair of optical fibers, a 50GBASE-LR transceiver supporting bi-directional transmission on a pair of optical fibers, an ITU G.984 compliant G-PON transceiver, an ITU G.987 compliant NG-PON2 transceiver, an XGS-PON transceiver, a 25G-E-PON transceiver, a 10GBASE-SR small form pluggable transceiver that supports duplex 10 Gbit per second transmission and reception on a pair of OM4, OM3, OM2, or OM1 multimode optical fibers between the node and the hub.

Within the node, the connection or connections between the optical fiber and optical transceiver may be in the form of a mechanical or fusion splice to the optical transceiver pigtail, or optical connector directly mounted, fusion spliced, or mechanically spliced to the transmission fiber, with the optical connector plugged into the optical transceivers-compatible optical receptacle. The included copper wires may be in the form of traditional terminal blocks or lugs.

The entire finished assembly may be packaged on a reel (as shown in FIG. 1) to facilitate safe and effective transport to the installation location, where an additional advantage of the embedded, in-line wireless node is that it facilitates in-field deployment by tradespeople with limited technical training.

What is claimed is:

1. An optical fiber communication cable comprising:
   at least one optical fiber disposed in an axial direction along a signal path;
   at least one electrical power conductors disposed in the axial direction along the signal path; and
   a plurality of embedded wireless access nodes disposed in a spaced-apart arrangement along the signal path, each embedded wireless access node coupled to both the at least one optical fiber and the at least one electrical power conductor, wherein each embedded wireless access node further comprises
   at least one RF antenna;
   a wireless radio transceiver powered by the at least one electrical power conductor and coupled to the at least one RF antenna, the wireless radio transceiver providing bidirectional communication with wireless devices within range of the RF antenna and converting communications between radio signals and electrical signals;
   an optical transceiver powered by the at least one electrical power conductor and coupled to the at least one optical fiber, the optical transceiver connected to the wireless radio transceiver for providing bidirectional communication with the wireless radio transceiver and converting communications between electrical signals and optical signals, with converted optical signals coupled onto the at least one optical fiber,
   wherein the plurality of embedded wireless access nodes includes a replacement wireless access node available for use during maintenance of an installed optical fiber cable.

2. The optical fiber communication cable as defined in claim 1 wherein the at least one optical fiber comprises a single optical fiber, with each embedded wireless access node further comprises an optical splitter/combiner for coupling to the single optical fiber.

3. The optical fiber communication cable as defined in claim 2 wherein the optical splitter/power combiner provides bidirectional optical communication with the single optical fiber.

4. The optical fiber communication cable as defined in claim 2 wherein at least one embedded wireless access node includes a wavelength division multiplexer (WDM) for providing bidirectional optical communication with the single optical fiber.

5. The optical fiber communication cable as defined in claim 1 wherein the at least one optical fiber comprises a plurality of optical fibers, with a separate optical couple coupled to each wireless access node of the at least one embedded wireless access node.

6. The optical fiber communication cable as defined in claim 1 wherein the spacing between adjacent wireless access nodes of the plurality of embedded wireless access nodes is essentially the same.

7. The optical fiber communication cable as defined in claim 1 wherein different spacings are used between adjacent embedded wireless access nodes of the plurality of embedded wireless access nodes, the different spacings associated with wireless devices within range of each wireless access node.

8. The optical fiber communication cable as defined in claim 1, wherein at least one group of embedded wireless access nodes is pre-installed within the optical fiber communication cable during its assembly to create an integrated arrangement.

9. The optical fiber communication cable as defined in claim 1, wherein at least one embedded wireless access node is installed during deployment of the optical fiber communication cable.

10. The optical fiber communication cable as defined in claim 1 wherein the optical fiber communication cable is disposed along an aerial installation for utilization with a plurality of wireless devices, the location of each embedded wireless access node based upon geographic locations of the plurality of wireless devices.

11. The optical fiber communication cable as defined in claim 10 wherein one or more of the plurality of embedded wireless access nodes are configured to be attached to utility poles.

12. The optical fiber communication cable as defined in claim 10 wherein one or more of the plurality of embedded wireless access nodes are configured to be coaxial with the communication cable and disposed at locations between utility poles.

13. The optical fiber communication cable as defined in claim 1 wherein the optical fiber communication cable is disposed as an underground installation.

14. The optical fiber communication cable as defined in claim 1 wherein the optical fiber communication cable is disposed within a building as an interior wireless access network.

15. A fiber-to-the-wireless node communication system comprising
   an optical communications and power node for communicating with a backbone communication network; and
   a first optical fiber communication cable coupled to the optical communication and power node and distributed along a defined geographic area to communicate with a plurality of wireless communication locations, the first optical fiber communication cable comprising
   at least one optical fiber disposed in an axial direction along a signal path for supporting bidirectional optical communication with the optical communications and power node;

at least one electrical power conductors disposed in the axial direction along the signal path and receiving electrical power from the optical communications and power node;

a plurality of embedded wireless access nodes disposed at predetermined locations along the signal path based upon a spacing of the plurality of wireless communication locations, each embedded wireless access node comprising at least one RF antenna;

a wireless radio transceiver powered by the at least one electrical power conductor and coupled to the at least one RF antenna, the wireless radio transceiver providing bidirectional communication with wireless devices within range of the RF antenna and converting communications between radio signals and electrical signals; and an optical transceiver powered by the at least one electrical power conductor and coupled to the at least one optical fiber, the optical transceiver providing bidirectional communication with the wireless radio transceiver and converting communications between electrical signals and optical signals, with converted optical signals coupled onto the at least one optical fiber; and a replacement wireless access node for use as either one of a replacement wireless access node and an additional wireless access node for providing an additional wireless access point.

16. The fiber-to-the-wireless node communication system as defined in claim 15, wherein the communication system further comprises a second optical fiber communication cable coupled to the first optical fiber communication cable, the second optical fiber communication cable comprising at least one optical fiber disposed in an axial direction along a signal path for supporting bidirectional optical communication with the optical communications and power node;

at least one electrical power conductors disposed in the axial direction along the signal path and receiving electrical power from the optical communications and power node; and a plurality of embedded wireless access nodes disposed at predetermined locations along the signal path based upon a spacing of the plurality of wireless communication locations, each embedded wireless access node comprising at least one RF antenna;

a wireless radio transceiver powered by the at least one electrical power conductor and coupled to the at least one RF antenna, the wireless radio transceiver providing bidirectional communication with wireless devices within range of the RF antenna and converting communications between radio signals and electrical signals; and an optical transceiver powered by the at least one electrical power conductor and coupled to the at least one optical fiber, the optical transceiver providing bidirectional communication with the wireless radio transceiver and converting communications between electrical signals and optical signals, with converted optical signals coupled onto the at least one optical fiber.

17. The fiber-to-wireless-node communication system as defined in claim 16 wherein the second optical fiber communication cable is coupled to an opposing end termination of the first optical fiber communication cable, extending wireless communication to a larger geographic area.

18. The fiber-to-the-wireless node communication system as defined in claim 17 wherein the system further comprises additional optical fiber communication cables with embedded wireless access nodes concatenated in a series connection to the second optical fiber communication cable.

19. The fiber-to-wireless node communication system as defined in claim 16 wherein the first and second optical fiber communication cables are coupled together in a ring architecture, with each embedded wireless access node configured as a bidirectional device for communicating along both the first optical fiber communication cable and the second optical fiber communication cable.

* * * * *